United States Patent Office 2,975,220
Patented Mar. 14, 1961

2,975,220

FLUORINATED ORGANIC COMPOUNDS

Murray Hauptschein, Glenside, and Milton Braid, Philadelphia, Pa., assignors to Pennsalt Chemicals Corporation, Philadelphia, Pa., a corporation of Pennsylvania No Drawing. Filed Nov. 13, 1958, Ser. No. 773,551

16 Claims. (Cl. 260—653.1)

This invention relates to fluorinated organic compounds and more particularly, is concerned with low molecular weight polymers, particularly those which are liquid at room temperature, prepared from vinylidene fluoride.

Liquid low polymers (usually referred to as telomers) of haloolefins, particularly those containing a high proportion of fluorine are known to be flame resistant and to have superior chemical and thermal stability in contrast to hydrocarbon oils. Because of their non-flammability and superior stability, these halocarbon oils may be used, for example, as lubricants, hydraulic fluids, damping fluids, etc. in applications involving exposure to relatively high temperatures and/or exposure to chemical attack, which would cause hydrocarbon oils to degrade rapidly. Although having superior chemical and thermal stability, the halogenated telomer oils which have been thus far suggested, and particularly those containing high proportions of fluorine, have suffered from the disadvantage of undergoing marked changes in viscosity with change in temperature. This is true for example of commercially available telomer oils prepared from the olefin chlorotrifluoroethylene which undergo considerably larger changes in viscosity with temperature than hydrocarbon oils of corresponding viscosity. Such a high rate of viscosity change with temperature is a distinct disadvantage in many cases. For example, an excessive decrease in viscosity for example will seriously diminish the lubricant properties of an oil or its usefulness as a hydraulic fluid.

There is accordingly, a need for liquids of an oily nature suitable as lubricants, hydraulic fluids and the like, which are non-flammable, have relatively high chemical and thermal stability and which at the same time have desirable viscosity temperature properties, that is to say, which undergo relatively small changes in viscosity with change in temperature.

In accordance with the present invention, a new class of telomers prepared from the olefin vinylidene fluoride has been found which possesses this desirable combination of properties. These new telomers are essentially homotelomers of vinylidene fluoride and are characterized in that at least one end of the telomer-chain containing the repeating ($CH_2CF_2$) units is provided with a halogenated radical having at least 3 carbon atoms. In the course of investigations leading to the present invention, it was found that the homotelomers of vinylidene fluoride, in the absence of such a terminal group containing at least 3 carbon atoms, are either light volatile liquids or solids rather than liquids of an oily nature suitable as lubricants and the like. It was found for example, that vinylidene fluoride telomers of the type $CF_3(CH_2CF_2)_nCl$ when the value of $n$ is 1 and 2 are light liquids of little or no utility as lubricants, and when the value of $n$ is three and above are solids melting above room temperature. In contrast to this latter type of telomers which change abruptly from light volatile liquids to solids as the telomer chain length increases, it becomes possible with the telomers of the invention, having halogenated end groups of 3 or more carbon atoms, to obtain relatively viscous non-volatile oils and greases of good lubricant properties, the viscosity of which changes relatively slowly with temperature. The melting point of the telomers of the invention rather than increasing abruptly with increasing chain length, tends to increase more gradually over a relatively wider range of telomer chain lengths.

The telomers of the invention may be prepared by reacting vinylidene fluoride with a telogen of the general formula RZ where R is a halogenated radical having from 3 to 12 carbon atoms and preferably from 3 to 9 carbon atoms selected from the group consisting of radicals of the formula $ACX_2-$,

and $ACX_2CHX-$, where X may be fluorine or chlorine; where A and B may be aryl radicals, alkyl radicals or cycloalkyl radicals containing only elements selected from the class consisting of carbon, halogen and hydrogen; and where Z may be iodine or bromine. When A or B is aryl, it is preferably phenyl. When X occurs twice or more in the same compound it may be the same or different.

Preferably A and B are perfluoroalkyl, perfluorochloroalkyl, perfluorohydroalkyl, or perfluorochlorohydroalkyl radicals. As used herein, the term perfluoro means containing only fluorine and carbon. Perfluorochloro means containing only fluorine, chlorine and carbon. Perfluorohydro means containing only fluorine, hydrogen and carbon in which the molar ratio of fluorine : hydrogen is at least 1:1. Perfluorochlorohydro means containing only fluorine, chlorine, hydrogen and carbon in which the molar ratio of fluorine plus chlorine to hydrogen is at least 1:1.

Particularly preferred are telogens in which R is a branched chain alkyl group, especially those having from 3 to 9 carbon atoms. A particularly valuable class of telogens are those in which R is a branched chain perfluoroalkyl or a perfluorochloroalkyl radical having from 3 to 9 carbon atoms.

Generally, telogens in which Z is iodine are preferred since the iodide telogens generally react with vinylidene fluoride more readily and in better yields to give the desired telomers.

Telogens which are particularly suitable for reaction with vinylidene fluoride to produce the telomers of the invention are:

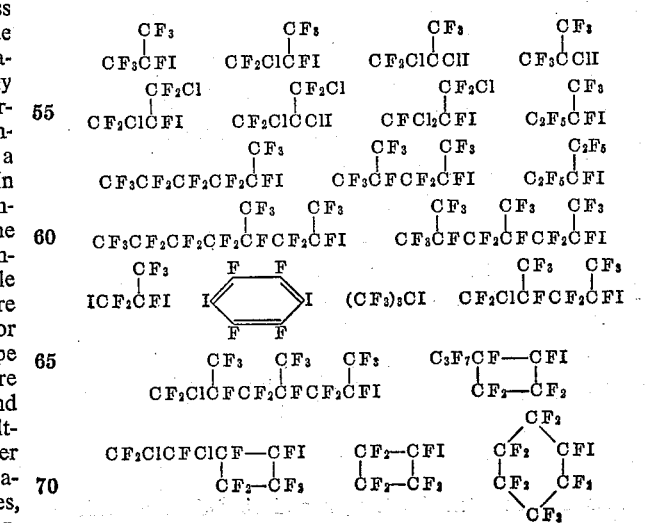

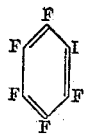 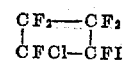

Other suitable telogens are:

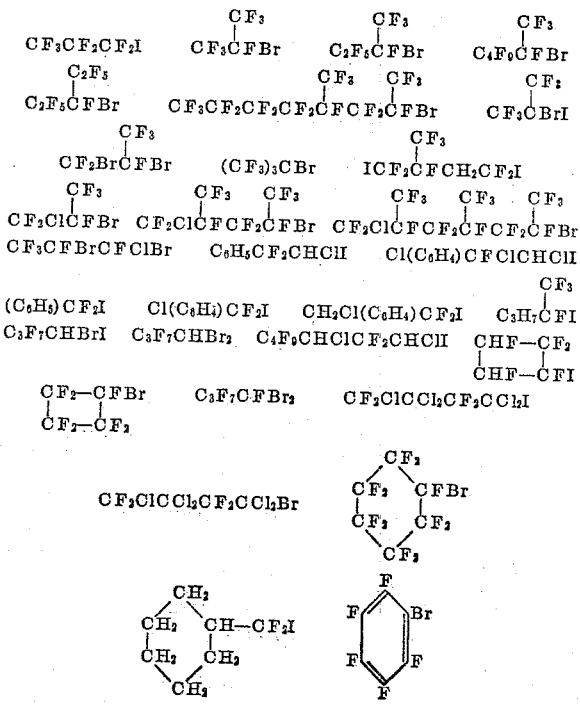

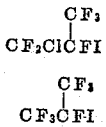

The above telogens can be prepared in many cases by the addition of $I_2$, $Br_2$, iodine monochloride, or iodine monofluoride to the corresponding olefin. For example, the telogens

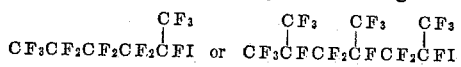

can be prepared by the addition of ICl and IF respectively to perfluoropropene $CF_2=CFCF_3$. The ICl adduct may be prepared by treating perfluoropropene with iodine monochloride at e.g. 100° C. while the IF adduct may be prepared by treating perfluoropropene with a mixture of iodine and $IF_5$ at a temperature of 0° C. in the presence of a catalyst consisting of metallic aluminum and aluminum iodide. The addition to other olefins proceeds in a similar fashion. Some of the longer chain telogens such as

are most conveniently prepared by telomerization reactions such as described in the copending application of Hauptschein et al. Serial No. 701,995, filed December 11, 1957. For example

may be prepared by the reaction of $CF_3CF_2CF_2I$ with $CF_3CF=CF_2$ at 200° C. at about 5000 lbs./in.² gage as described in Example 1 of that application, while

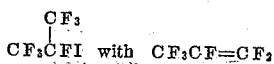

may be prepared under similar conditions by the reaction of $CF_3CF_2I$ with $CF_3CF=CF_2$ Reaction between the telogen and vinylidene fluoride is preferably carried out using heat alone, that is in the absence of initiators such as ultraviolet light or peroxides, at temperatures ranging from about 120° C. to 350° C. and preferably from about 140° C. to about 250° C.

The other reaction conditions are not critical. The reaction pressure may range from atmospheric to superatmospheric pressure such as 20,000 lbs./in.² gage, pressures between at about 100 and about 10,000 lbs./in.² gage usually being preferable. Reaction time is whatever is required to give satisfactory conversions and the optimum reaction time will depend on the particular telogen employed and on the temperature. To a certain extent it influences the chain-length of the product obtained. Normally the reaction time is from about 10 minutes to about two weeks, usually from about one-half hour to about two days.

The proportion of olefin : telogen is likewise not critical with respect to whether the reaction will or will not take place, but may be employed to influence the chain-length of the telomer, higher olefin:telogen ratios favoring the higher molecular weight telomers. Normally the olefin:telogen ratio in the reaction mixture should be between about 0.5:1 to about 20:1 and preferably between 1:1 and about 12:1. It is sometimes advantageous to start with a smaller proportion of olefin to telogen than is desired in the product telomer and then add additional olefin as the reaction proceeds. In this way, the range of molecular weights (that is telomer chain-lengths) that is obtained as reaction products may be decreased and greater yields of the desired molecular weight telomers obtained.

The telomers produced by the procedures described above where the telogen is monofunctional (that is contains only one bromine or iodine atom) have the general formula $R(CH_2CF_2)_nZ$ where $R$ and $Z$ are as defined above and where $n$ is an integer of the series 1, 2, 3, 4 etc. Where the telogen is bifunctional (that is containing two iodine or bromine atoms) one or both of the iodine or bromine atoms may react depending on their relative reactivity at the reaction conditions used. If one is relatively less reactive than the other only one may react while if they both have substantially the same reactivity or if sufficiently vigorous conditions are used (i.e. higher temperatures) both may react. In general iodides are considerably more reactive than bromides so that telogens containing both iodine and bromine will generally react preferentially at the iodine atom and the bromine will not react at all unless relatively high temperatures are used. Similarly secondary iodine or bromine atoms (i.e. on a carbon atom linked directly to two other carbons) are generally more reactive than primary iodine or bromine atoms and consequently the secondary bromine or iodine atom only may react if the reaction conditions are not sufficiently vigorous. If in difunctional telogens both iodines or bromines react with vinylidene fluoride, a product is obtained having a telogen residue between two vinylidene fluoride chains such as

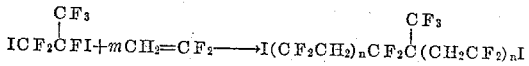

In these cases the three carbon atom or more halogenated radical serves as the end group for both chains achieving the desired purpose of providing lower melting telomers suitable as lubricant oils and the like. Telomers of this type may be represented by the general formula $Z(CF_2CH_2)_n—R^1—(CH_2CF_2)_nZ$ where $n$ and $Z$ are as defined above and where $R^1$ is a divalent radical otherwise similar to R as defined above. $R^1$ is preferably a divalent perfluoroalkyl or perfluorochloroalkyl radical preferably of the branched chain type.

The telomerization reaction inherently produces a mixture of telomers of varying chain-lengths and correspondingly varying molecular weights. The average chain-length and the spread of molecular weights produced by the telomerization reaction can be controlled within limits as discussed above by varying the reaction time, the olefin:iodide molar ratio, and reaction temperature. If desired, individual compounds can be separated from the mixture, e.g. by careful fractional distillation, or the raw mixture of telomers can be separated into fractions of narrower ranges of molecular weight having desired viscosity or other properties. It is intended that the appended claims cover both the individual compounds and mixtures of the individual compounds.

As indicated by the formula above, these telomers are open chain compounds in which the chain portion consists of a number of vinylidene fluoride units ($CH_2CF_2$) linked end to end in a straight chain. By studying the ultraviolet light maxima of these telomers in isooctane solution, it has been determined that the telomer chains terminate predominately in a —$CF_2Z$ group rather than a —$CH_2Z$ group. The ultraviolet light maxima, for example, of the iodide telomers is of the order of 270 m$\mu$ in isooctane solution. This value is characteristic of the —$CF_2I$ end group, the —$CH_2I$ end group having an ultraviolet spectrum maximum in isooctane of the order of 260 m$\mu$. Thus, while small amounts of telomer having —$CH_2Z$ end groups may be present, the bulk of the telomer product terminates in a —$CF_2Z$ group. While it is believed that the olefin units in the chain are connected to one another in a head-to-tail fashion, viz., —$CH_2CF_2CH_2CF_2CH_2CF_2$—, the structure indicated is not intended to preclude random orientation of the olefin in the chain in a head-to-head or tail-to-tail fashion at least to a minor extent.

The telomers described above, having terminal iodine or bromine atoms have some utility in themselves as lubricants, hydraulic fluids, and the like. It is generally preferred, however, to replace the terminal iodine or bromine atom with chlorine, fluorine or hydrogen in order to produce telomers which are more stable to heat and chemical reagents. Replacement of the terminal bromine or iodine atom by hydrogen may be carried out using lithium aluminum hydride or a conventional catalytic hydrogenation process. See for example Hauptschein, Saggiomo and Stokes, Journal of the American Chemical Society, 78, 680 (1956) for the use of $LiAlH_4$ in replacing iodine by hydrogen in perfluoro iodides. These same procedures may be employed in replacing the terminal iodine with hydrogen in the telomers of the invention.

Replacement of the terminal bromine or iodine with fluorine may be accomplished by treating the telomer bromide or iodide with fluorinating agents such as $SbF_3Cl_2$ or a mixture of $SbF_3$ and $SbCl_5$ at normal or slightly elevated temperature such as from 20° C. to 150° C.

Replacement of the terminal iodine or bromine atom with chlorine may be accomplished by treating the telomer iodide or bromide with elemental chlorine at temperatures ranging from 20° C. to 250° C. with or without ultraviolet light irradiation. It has been found that iodine chlorides such as iodine monochloride which are formed as a by-product of the chlorination reaction tend to catalyze the formation of some double bond containing material, probably through loss of HI from the telomer iodide to produce unsaturated compounds of the probable formula $R(CH_2CF_2)_{n-1}CH=CF_2$. It is accordingly preferable to conduct the chlorination in such fashion that the iodine chloride by-product is removed from the reaction mixture as it is formed. If the iodine chloride is permitted to accumulate in the reaction mixture olefinic material tends to form even at room temperature. One suitable method for accomplishing this is to conduct the chlorination at an elevated temperature at which the iodine chlorides, mostly iodine monochloride, formed are kept in the vapor phase (temperatures of from 160° C. to 200° C. being generally suitable for this purpose) and to separate the more volatile iodine chlorides from the telomer chlorides as they are formed. A suitable technique is to pass the liquid telomers and a large excess of gaseous chlorine or a smaller excess of chlorine mixed with an inert gas e.g. nitrogen, concurrently through a reaction zone, e.g. a packed column maintained at temperatures of from 160° C. to 200° C., where replacement of iodine by chlorine takes place. The large excess of gas sweeps out the iodine chloride vayor as it forms and removes it from the reaction zone after only a very short contact with the liquid telomer iodides. Telomer chlorides are separately removed from the bottom of the column substantially free from iodine chlorides.

It has also been noted that chloride ions in general tend to catalyze the loss of HI to form double bonds in the telomer iodides of the invention. Thus, lithium chloride potassium chloride and sodium chloride at temperatures of e.g. 100° to 200° C. surprisingly react with the telomer iodides $R(CH_2CF_2)_nI$ to produce olefins of the formula $R(CH_2CF_2)_{n-1}CH=CF_2$. These olefins are useful e.g. as intermediates for conversion to carboxylic acids, e.g. of the formula $R(CH_2CF_2)_{n-1}COOH$ which in turn may be converted to esters useful as lubricants. When it is desired to produce telomer chlorides to the exclusion of such olefins, chloride ion producing materials such as LiCl, KCl and NaCl should not be present.

The telomers initially produced by the telomerization reaction, as well as those resulting from replacement of the terminal iodine or bromine atoms with hydrogen, fluorine or chlorine may be represented by the general formula $R(CH_2CF_2)_nQ$ where R and n are as defined above and where Q is hydrogen or halogen.

Another suitable procedure for converting the initial telomer iodides or bromides into more stable products is to subject the initial telomers to a coupling reaction in which two moles of telomer are coupled end-to-end by elimination of the terminal iodine or bromine atom between two molecules. Thus two moles of the telomer iodide $R(CH_2CF_2)_nI$ may be coupled by the use of ultraviolet light in the presence of mercury in accordance with the following reaction:

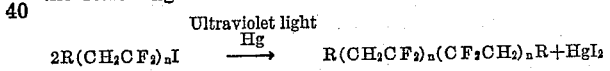

$$2R(CH_2CF_2)_nI \xrightarrow[\text{Hg}]{\text{Ultraviolet light}} R(CH_2CF_2)_n(CF_2CH_2)_nR + HgI_2$$

The techniques for carrying out such coupling reactions are described in detail in the co-pending application of R. N. Haszeldine, Serial No. 526,087, filed August 2, 1955.

The stabilized telomers produced by coupling procedures may be represented by the general formula:

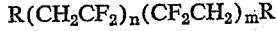

$$R(CH_2CF_2)_n(CF_2CH_2)_mR$$

where R is as defined above and where n and m are integers of the series 1, 2, 3, 4, and may be the same or different. Where mixtures of telomers are coupled having varying chain-lengths, the values of n and m in the coupled telomers will generally be different. Where mixtures of telomers having different end groups are coupled the values for R may also be different in the individual coupled compounds.

In order to obtain products which are liquid oils or soft solids at room temperature or slightly above the value of n in the case of the non-coupled telomers should not exceed about 16 and the value $n+m$ in the case of the coupled telomers should not exceed about 20. The maximum telomer chain-length at which oils or soft solids are obtained will vary depending upon the size and configuration of R. In general, end groups that are sterically bulky such as branched chain alkyl groups tend to increase the range of chain-lengths over which the telomers are liquids or soft solids.

In order to obtain oils of suitable viscosity for lubricant, hydraulic fluid uses and the like the value of n in the case of the non-coupled telomers should be at least 3, while the value of $n+m$ in the coupled telomers should be at least about 6. Although the shorter chain telomers are liquids, they are generally relatively light and volatile and thus not suitable as lubricants. They are, however, useful for other applications such as for dielectric media in transformers and condensers, and may be present in small amounts in heavier bodied oils consisting predominantly of telomers of higher molecular weight.

Oils of the most useful range of viscosity are generally those, in the case of the non-coupled telomers, which consist predominantly of telomers in which the value of $n$ is in the range of from 4 to 10, and in the case of the coupled telomers which consist predominantly of telomers in which the value of $n+m$ is in the range of 6 to 15. The optimum value of $n$ or $n+m$ in any particular case will depend upon the size and configuration of the R end group.

While the invention does not depend upon any particular theory relating the structure of the telomers of the invention to the desirable properties which they display, it is believed that the desirable viscosity-temperature properties of these telomers is related to the viscometric properties of the $—CH_2CF_2—$ telomer chain in which the alternating $—CH_2—$ groups allow freer rotation than other configurations. For example it is believed that $—CH_2CF_2CH_2CF_2—$ chains are inherently less effected by changes in temperature than isomeric compounds in which rotation would be more restricted such as compounds containing

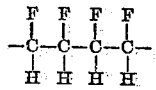

chains. It is also believed that the same type of structure, i.e. the repeating $—CH_2CF_2—$ units, is responsible for the fact that telomers of this type tend to be solids at relatively low molecular weights. As pointed out previously, it is not possible to produce liquid oils of lubricant viscosity from the olefin $CH_2=CF_2$ using 1 or 2 carbon telogens such as $CF_3I$ or $C_2F_5I$. Instead of obtaining relatively heavy oils, solids are obtained when the chain contains 3 or more olefin units. This strong tendency to form solids is believed due to the fact that the telomer chains tend to orient with one another in a close packed crystal type arrangement. It is believed that by introducing at least one bulky end group on the telomer chain the orientation of the telomer chains in a crystalline pattern is sterically hindered, thus preventing a rapid transition from light liquids to crystalline-like solids. This explanation is borne out by the fact that branched-chain end groups which tend to create more steric hindrance to the close packed orientation of the telomer chains are more effective in extending the range of molecular weights over which the telomers are liquids than straight chain end groups of the same molecular weight. Likewise, the coupled telomers having two end groups are generally liquids over a wider range of telomer chain length than the corresponding non-coupled telomers.

The new telomers of the invention combine the advantages of flame resistance and good chemical and thermal stability with desirable viscosity temperature properties.

The telomer oils that may be prepared in accordance with the invention undergo relatively smaller changes in viscosity with temperature than fluorinated oils now available and in some cases display viscosity-temperature relationships approximating those of hydrocarbon oils. They are thus suited as lubricants, hydraulic fluids, damping fluids, and for similar applications where relatively wide variations in temperature are involved making the use of other types of fluorinated oils impossible or inconvenient.

The very marked improvement in viscosity-temperature characteristics displayed by the telomers of the invention may be appreciated by comparing the ASTM viscosity slope of telomer oils of the invention with other fluorinated telomer oils. The ASTM viscosity slope is the slope of the curve expressing viscosity as a function of temperature, plotted on an ASTM (D341–43) viscosity chart. The higher the value of the slope, the higher is the rate of change of viscosity with temperature. Highly fluorinated oils such as those based on the olefin perfluoropropene described and claimed in the co-pending application of Hauptschein, Braid and Lawlor, Serial No. 701,995 of December 11, 1957, have ASTM slopes of the order of 1.3 to 1.4, while perfluorochloro telomer oils based on the olefin chlorotrifluoroethylene have ASTM slopes of the order of 1. The telomer oils of the invention on the other hand, display ASTM slopes generally well below 1.0 and in many cases of the order of 0.7 to 0.8 approaching the slopes displayed by conventional hydrocarbon lubricants.

The invention will be further described with reference to the following specific examples which, however, are given for the purposes of illustration only and are not to be taken as in any way limiting the invention beyond the scope of the appended claims. In the examples, the following general procedure is used. A Monel or stainless steel autoclave is charged with the telogen RZ and cooled in liquid nitrogen. Vinylidene fluoride is admitted to the cooled autoclave by gaseous transfer in vacuo. After warming to room temperature, the autoclave is shaken and heated for the period of reaction and then allowed to cool. Unreacted olefin is recovered by condensation in refrigerated receivers and the remaining products are distilled in small Vigreux distillation units to effect separation of the individual telomer fractions.

*Example 1.—Reaction of $CH_2=CF_2$ with 1-iodoperfluoropropane*

160 g. (0.54 mole) of 1-iodoperfluoropropane and 131 g. (2.04 moles) of 1,1-difluoroethylene (3.8:1 molar ratio of olefin:iodide) are heated at 181° C. while shaking for 23 hours. The pressure drops from 4000 lbs./in.² gage to 1300 lbs./in.² gage during the heating period, nearly half of the drop occurring during the first 3 hours.

After recovery of 73 g. of 1,1-difluoroethylene and 8 grams of 1-iodoperfluoropropane, the remaining 197 g. of product consisting of telomers of the formula $C_3F_7(CH_2CF_2)_nI$ is distilled and the following fractions obtained:

(a) 31% yield of telomer consisting essentially of $C_3F_7(CH_2CF_2)I$ the middle cut having a boiling point of 55° C. at 101 mm. Hg, a refractive index $n_D^{23}$ 1.3502, and a molecular weight of 360. *Analysis.*—Calculated: C, 16.7; H, 0.56; F, 47.5. Found: C, 16.9; H, 0.65; F, 47.6.

(b) A 32% yield of telomer consisting essentially of $C_3F_7(CH_2CF_2)_2I$, the middle cut having a boiling point of 100° C. at 101 mm. Hg, a refractive index $n_D^{22}$ 1.360, and a molecular weight of 424. *Analysis.*—Calculated: C, 19.8; H, 0.95; F, 49.3. Found: C, 20.2; H, 1.2; F, 49.8.

(c) A 23% yield of telomer consisting essentially of $C_3F_7(CH_2CF_2)_3I$, the middle cut having a boiling point of 111° C. at 19 mm. Hg, a refractive index $n_D^{24}$ 1.3668 and a molecular weight of 488. *Analysis.*—Calculated: C, 22.2; H, 1.2; F, 50.6. Found: C, 22.4; H, 1.2; F, 50.9.

(d) A 9% yield consisting essentially of $$C_3F_7(CH_2CF_2)_4I$$

the middle cut having a boiling point of 88° C. at about 0.1 mm. Hg, a refractive index $n_D^{23}$ of 1.3707 and a molecular weight of 552. *Analysis.*—Calculated: C, 23.9; H, 1.5. Found: C, 23.8; H, 1.5.

(e) A 5% yield of telomers of the above formula in which the value of $n$ ranges from 4 to 7, the average value of $n$ being about 5. This fraction has a boiling range of 90° to 158° C. at about 0.1 mm. Hg.

In carrying out the procedures described above in this and in the following examples, free iodine is rarely observed, and then only to the extent of a few tenths of a gram, indicating the absence of significant side reactions under the conditions used. In this and in the following examples care is taken to exclude oxygen to prevent reaction with the iodides.

The molar extinction coefficients in isooctane of fractions (a), (b), (c), and (d) are 318, 324, 274, and 287 respectively. The ultraviolet spectrum maxima in isooctane of these fractions are 270 m$\mu$, thus indicating that these telomers have terminated predominantly or entirely in —$CF_2I$ groups.

Careful analysis can show in some cases the presence of some telomers having terminal —$CH_2I$ groups. For example, fraction (a) consisting essentially of $$C_3F_7CH_2CF_2I$$

is analyzed by vapor-liquid partition chromatography using a 2 meter Perkin-Elmer "B" column operating at 76° C. and under a helium pressure of 30 lbs./in.$^2$ gage and shown to consist of 95% $C_3F_7CH_2CF_2I$ and 5% $C_3F_7CF_2CH_2I$. Respective elution times of air, $$C_3F_7CH_2CF_2I$$

and $C_3F_7CF_2CH_2I$ are 0.6 minute, 13.1 minutes and 14.8 minutes. Pure specimens of these two iodides are isolated chromatographically. The ultra-violet maximum in isooctane solution of $C_3F_7CH_2CF_2I$ is at 272 m$\mu$ while that of $C_3F_7CF_2CH_2I$ is at 265 m$\mu$.

*Example 2.—Reaction of* $CH_2=CF_2$ *with 1-iodoperfluoropropane*

The procedure of Example 1 is repeated using a molar ratio of $CH_2=CF_2:C_3F_7I$ of 2.3:1. The reaction is carried out at 185° C. for 28 hours. During this time the pressure drops from 3800 lbs./in.$^2$ gage to 350 lbs./in.$^2$ gage. A conversion of telogen to telomer of 89% is obtained. The product consists of a mixture of telomer iodides of the formula $C_3F_7(CH_2CF_2)_nI$. By distillation, the product is separated into the following fractions having similar physical properties as the corresponding fractions in Example 1:

(a) A 41% yield of telomer consisting essentially of $C_3F_7(CH_2CF_2)I$.
(b) A 34% yield of a fraction consisting essentially of $C_3F_7(CH_2CF_2)_2I$.
(c) A 15% yield of a fraction consisting essentially of $C_3F_7(CH_2CF_2)_3I$.
(d) A 6% yield of a fraction consisting essentially of $C_3F_7(CH_2CF_2)_nI$.
(e) A 4% yield of a mixture of telomers of the above formula in which the average value of $n$ is equal to 5.

*Example 3.—Fluorination of* $C_3F_7H_2CF_2I$

Seven grams (0.028 mole) of $SbF_3Cl_2$ are placed in a 30 milliliter round bottom flask fitted with a magnetic stirrer and a short, packed distillation column and head. Ten grams (0.028 mole) of $C_3F_7CH_2CF_2I$ prepared in accordance with Example 1 are added dropwise down the column and mixed with the antimony catalyst. Heat of the reaction caused the temperature to rise to 70–80° C. The mixture is stirred for 30 minutes and then heated to distill the fluorinated product consisting of 5 grams of $C_3F_7CH_2CF_3$ (70° yield). The crude product is washed with dilute aqueous sodium bisulfite solution, dried over anhydrous magnesium sulfate and redistilled to give a colorless liquid having a boiling point of 47° C. and shown by vapor fractometry to have a purity of 99.5 mole percent. *Analysis.*—Calculated for $C_5H_2F_{10}$: C, 23.83; H, 0.79. Found: C, 23.92; H, 1.20.

*Example 4.—Fluorination of* $C_3F_7(CH_2CF_2)_2I$

Following the procedure described in Example 3, 21.2 grams (0.05 mole) of $C_3F_7(CH_2CF_2)_2I$ prepared in accordance with Example 1 is fluorinated with 12.5 grams (0.05 mole) of $SbF_3Cl_2$. Upon distillation of the fluorinated product, 14.3 grams (90% yield) of $$C_3F_7(CH_2CF_2)_2F$$

is obtained having a boiling point of 102° C. and shown by vapor fractometry to be 99.2% pure. *Analysis.*—Calculated for $C_7H_4F_{12}$: C, 26.60; H, 1.26. Found: C, 26.84; H, 1.38.

*Example 5.—Fluorination of* $C_3F_7(CH_2CF_2)_{3av}I$

Following the procedure described in Example 3, 24 grams (0.05 mole) of telomer iodide of the above formula prepared in accordance with Example 1 in which the average value of $n$ is 3 is reacted with 12.5 grams (0.05 mole) of $SbF_3Cl_2$ at 100° to 110° C. for 1 hour. The mixture is poured over ice and water, extracted several times with trifluorotrichloroethane, then dried over anhydrous magnesium sulfate and vacuum distilled to give 14 grams of colorless liquid boiling from 85° C. at 57 mm. Hg to 55° C. at 17 mm. Hg and consisting of telomer fluorides of the formula $C_3F_7(CH_2CF_2)_nF$ in which the average value of $n$ is 3.

*Example 6.—Fluorination of* $C_3F_7(CH_2CF_2)_{n>4}I$

Fifty grams (about 0.1 mole) of telomer iodides of the formula $C_3F_7(CH_2CF_2)_nI$ prepared in accordance with Example 1 in which the average value of $n$ is greater than 4, boiling higher than 85° C. at 0.1 mm. Hg is mixed with 25 grams of $SbF_3Cl_2$ and 100 milliliters of trifluorotrichloroethane and the mixture placed in a 300 milliliter stainless steel autoclave and heated while shaking at 100° C. for 2 hours. The autoclave is cooled in an ice bath and vented. The reaction mixture is then poured over ice and water and washed with aqueous sodium bisulfite, sodium carbonate (10%) and water. After drying over anhydrous magnesium sulfate, the trifluorotrichlorethane solvent is evaporated on a steam bath to give 32 grams of a reddish brown oil. Upon vacuum distillation, 24 grams of a pale yellow liquid with solids forming in the condenser at the end of the distillation was obtained, having a boiling range of 81° C. to 134° C. at about 0.1 mm. Hg. Eight grams of dark, solid residue remains undistilled.

Infrared analysis of the distilled product shows a trace of olefin present indicated by a weak band at 6.04$\mu$. The distilled product is dissolved in 100 milliliters of trichlorotrifluoroethane and anhydrous ammonia is passed through the solution for 30 minutes at room temperature. The solution is filtered to produce about 0.1 gram of water soluble solids, giving positive fluoride ion and iodide ion tests. The trichlorotrifluoroethane is evaporated and the oil product (about 24 grams) redistilled in a small helipack column to give a pale yellow solid having a boiling range of 66° to 90° C. at about 0.1 mm. Hg and a melting range of 29° to 35° C. consisting of telomer fluorides of the formula $C_3F_7(CH_2CF_2)_nF$ in which the average value of $n$ is somewhat greater than 4. Infrared analysis of this product indicates that no detectible olefinic material is present.

*Example 7.—Fluorination of* $C_3F_7(CH_2CF_2)_{n>4}I$

Fifty grams of telomer iodides of the above formula prepared in accordance with Example 1 in which the average value of $n$ is somewhat greater than 4 is placed in a 300 milliliter stainles steel autoclave together with 18 grams (0.1 mole) of $SbF_3$, 30 grams (0.1 mole) of $SbCl_5$ and 100 milliliters of trifluorotrichloroethnae. The autoclave is heated at 110° C. for 2 hours while shaking and then cooled to room temperature and opened. Considerable free iodine is apparent indicating fluorination has occurred. The mixture is washed with aqueous sodium bisulfite solution, then with water, and then dried over anhydrous magnesium sulfate. The trichlorotrifluoroethane solvent is evaporated, leaving 31 grams of a brown oil having a boiling range of 57 to 87° C. at about 0.1 mm. Hg. Upon vacuum distillation a slightly orange colored solid is obtained which gives a positive Beilstein test indicating incomplete fluorination. The infrared spectrum shows a very slight trace of olefinic product present indicated by a small peak at 6.1µ. The product thus consists of telomer fluorides of the formula $C_3F_7(CH_2CF_2)_nF$ where the average value of $n$ is somewhat greater than 4 and containing minor amounts of corresponding telomer iodides which escaped fluorination.

*Example 8.—Chlorination of $C_3F_7CH_2CF_2I$*

Chlorine is passed through 23 grams (0.64 mole) of $C_3F_7CH_2CF_2I$ prepared in accordance with Example 1 at room temperature in a quartz reactor illuminated with a Hanovia ultra-violet lamp. A layer of liquid iodine monochloride is formed. After 2 hours the reaction mixture is poured over ice and water and washed with aqueous sodium bisulfite solution, then with water, and then dried over anhydrous magnesium sulfate to give a yield of 13.5 gram (80% yield) of product oil which upon distillation gives 10.8 grams of a colorless liquid having a boiling point of 68 to 70° C. Vapor-liquid partition chromatographic analysis of the latter liquid using a 2 meter Perkin-Elmer "B" column at 30° C. and a helium pressure of 30 lbs./in.² gage showed that the main fraction consists of two components, namely, 85% of $C_3F_7CH_2CF_2Cl$ and 15% of $C_3F_7CH=CF_2$. Respective elution times of air, $C_3F_7CH=CF_2$ and $C_3F_7CH_2CF_2Cl$ are 0.5 minute, 1.2 minutes and 8.6 minutes respectively.

The two components are separated and isolated chromatogrpahically. The olefin is identified by its infrared spectrum which is identical to that of a known sample prepared in accordance with Example 9. Analysis of $C_3F_7CH_2CF_2Cl$.—Calculated for $C_5H_2ClF_9$: C, 22.36; H, 0.75. Found: C, 22.47; H, 1.34.

The formation of the olefinic compound during the chlorination appears to be catalyzed by iodine monochloride formed during the reaction. By removal of iodine monochloride from the reaction mixture it is possible substantially to avoid the formation of unsaturated material in the course of the chlorination as illustrated in examples which follow.

*Example 9.—Reaction of $C_3F_7CH_2CF_2I$ with lithium chloride*

This example shows the effect of chloride ion from a source other than iodine monochloride on the formation of double bonds by loss of HI from the telomer iodides of the invention. A mixture of 10 grams of $C_3F_7CH_2CF_2I$ (fraction (a) of Example 1), 4.2 grams of lithium chloride and 15 milliliters of dimethyl formamide is placed in a still and stirred. The temperature is gradually raised from 30° C. to 155° C. over a total period of about 2 hours, and a colorless distillate is collected in the receiver having a boiling point of 36 to 37° C. The distillate is washed with water, dried over anhydrous magnesium sulfate and redistilled to give 4.6 grams (71% yield) of 2-hydroperfluoropentene-1, $C_3F_7CH=CF_2$, shown by vapor fractometry to be of 99 mole percent purity, the infrared spectrum of which shows a strong peak at 5.70µ characteristic of the —C=C— stretching vibration. Anlaysis.—Calculated for $C_5HF_9$: C, 25.88; H, 0.44. Found: C, 25.47; H, 0.54.

Water is added to the reaction residue which remains undistilled to dissolve lithium chloride and the unreacted iodide is recovered and analyzed by vapor-liquid chromatography and shown to consist of 86% $C_3F_7CH_2CF_2I$ and 14% of $C_3F_7CF_2CH_2I$. The increase in the amount of telomer in the reaction residue terminating in a $CH_2I$ group results from the fact that dehydroiodination of this latter end group does not take place in the presence of lithium chloride, the dehydroiodination apparently being confined to telomers terminating in a —$CF_2I$ group. Thus the original content of 5% of telomers having —$CH_2I$ end groups increased to 14% after the lithium chloride reaction.

*Example 10.—Reaction of $CH_2=CF_2$ with 2-iodoperfluorobutane*

A 1 liter 316-stainless steel autoclave was charged with 402 g. (1.17 moles) of 2-iodoperfluorobutane and 228 g. (3.56 moles) of 1,1-difluoroethylene and heated at 175° to 190° C. with shaking for 19 hours. 75 grams of olefin is recovered. The remaining products consist of a mixture of telomers of the formula $$C_2F_5CF(CF_3)[CH_2CF_2]_nI$$

These are distilled under reduced pressure to separate the following fractions:

(a) 101 g. consisting essentially of telomer of the above formula in which the value of $n$ equals 1, the middle cut of which has a boiling point of 67° C. at 100 mm. Hg, a refractive index $n_D^{25}$ 1.3501, and a molecular weight of 410. Analysis.—Calculated: C, 17.6; H, 0.49. Found: C, 17.9; H, 0.69.

(b) 200 g. consisting essentially of telomer in which the value of $n$ equals 2, the middle cut of which has a boiling point of 109° C. at 100 mm. Hg, a refractive index $n_D^{25}$ 1.3573 and a molecular weight of 474. Analysis.—Calculated: C, 20.3; H, 0.85. Found: C, 20.0; H, 0.94.

(c) 155 g. of a mixture of telomers of the above formula in which the average value of $n$ equals 3, having a boiling range of 35 to 73° C. at about 0.1 mm. Hg, the middle cut of which consists essentially of telomer in which the value of $n$ is equal to 3, having a boiling point of 96° C. at 8 mm. Hg, a refractive index $n_D^{28}$ 1.3630 and a molecular weight of 538. Analysis.—Calculated: C, 22.3; H, 1.1. Found: C, 22.6; H, 1.2.

(d) 40 g. of a fraction consisting of telomers of the above formula in which the average value of $n$ is equal to 4, having a boiling range of 47° C. to 75° C. at less than 0.1 mm. Hg, the middle cut of which consists essentially of telomer in which the value of $n$ equals 4, having a boiling point of 127° C. at 8 mm. Hg, a refractive index $n_D^{28}$ 1.3671 and a molecular weight of 602. Analysis.—Calculated: C, 23.9; H, 1.3; F, 53.7. Found: C, 24.2; H, 1.3; F, 53.4.

The above fractions contain from light to viscous oils at room temperature Fractions 1 and 2 show ultraviolet spectrum maxima in isooctane of 272 and 270 respectively and molar extinction coefficients in isooctane of 331 and 333 respectively, thus indicating that the telomers consist essentially of those having a —$CF_2I$ end group.

*Example 11.—Chlorination of $C_2F_5CF(CF_3)[CH_2CF_2]_nI$*

A fraction of telomer iodides of the above formula prepared in accordance with Example 10, in which the average value of $n$ is 5, is reacted photochemically with a slight stoichiometric excess of chlorine at room temperature. The product consists predominantly of the telomer chlorides $C_2F_5CF(CF_3)[CH_2CF_2]_nCl$ where the average value of $n$ is 5 and has an ASTM viscosity-temperature slope of the order of 0.8. Minor amounts (of the order of 15%) of telomers containing double bonds are also formed probably through the loss of HI to produce unsaturated telomers of the probable formula $$C_2F_5CF(CF_3)[CH_2CF_2]_{4av}CH=CF_2$$

Loss of HI to form double bonds appears to be catalyzed by iodine monochloride, as previously explained. By removal of iodine monochloride from the reaction mixture, it is possible to substantially avoid the formation of unsaturated telomers in the course of the chlorination as illustrated by the following example.

*Example 12.—Chlorination of $C_2F_5CF(CF_3)[CH_2CF_2]_nI$*

A fraction of telomer iodides of the above formula prepared in accordance with Example 10 in which the average value of $n$ is 6 is heated to a temperature of 160° C. and then metered drop by drop (while excluding oxygen) downwardly into the top of a vertical glass tube packed with glass helices and evenly heated by a furnace to a temperature of 160 to 180° C. An excess of chlorine preheated to 160° C. is passed into the top of the column and flows downwardly concurrently with the liquid telomer iodide. Replacement of iodine by chlorine and formation of iodine chlorides occur. The iodine chlorides separate from the liquid telomers as a vapor and the vapor is swept downwardly through the column by the stream of chlorine. At the bottom of the column the descending mixture of chlorine and iodine chloride vapor is swept out of the column by a stream of nitrogen introduced near the bottom of the column for this purpose. The liquid telomer chlorides flow out of the bottom of the column into a receiving flask. By the above procedure the iodine chlorides formed during the chlorination are removed from the reaction zone after only a very short contact with the telomer. The product consists substantially entirely of telomer chlorides of the formula $C_2F_5CF(CF_3)[CH_2CF_2]_nCl$ where the average value of $n$ is 6 and is essentially free from olefinic material. This telomer oil has an ASTM viscosity-temperature slope of the order of 0.75.

*Example 13.—Fluorination of*
$C_2F_5CF(CF_3)[CH_2CF_2]_nI$

A fraction of telomer iodides of the above formula prepared in accordance with Example 10 in which the average value of $n$ is equal to about 5 is fluorinated in the presence of a slight molar excess of $SbF_3Cl_2$ in a trichlorotrifluoroethane solvent in a stainless steel autoclave at 100° C. for 2 hours following the procedure of Example 6. The crude fluorinated product is worked up as in Example 6 to give a viscous oil consisting of the mixture of telomer fluorides of the formula $$C_2F_5CF(CF_3)[CH_2CF_2]_nF$$

where the average value of $n$ is 5, having ASTM viscosity-temperature slope of the order of 0.8.

*Example 14.—Fluorination of*
$C_2F_5CF(CF_3)[CH_2CF_2]_nI$

A fraction of telomer iodides of the above formula prepared in accordance with Example 10 in which the average value of $n$ is about 6 is fluorinated in a stainless steel autoclave in the presence of a mixture of $SbF_3$ and $SbCl_5$ and a trichlorotrifluoroethane solvent at a temperature of 110° C. for 2 hours. The crude fluorinated product is washed with aqueous sodium bisulfite solution, then water and dried over anhydrous magnesium sulfate. The trichlorotrifluoroethane is evaporated to give a viscous oil consisting of a mixture of telomer fluorides of the formula $C_2F_5CF(CF_3)[CH_2CF_2]_nF$ where the average value of $n$ is about 6, having an ASTM viscosity-temperature slope of the order of 0.75.

*Example 15.—Hydrogenation of*
$C_2F_5CF(CF_3)[CH_2CF_2]_nI$

A fraction of telomer iodides of the above formula prepared in accordance with Example 10 in which the average value of $n$ is equal to about 5, is reacted with a slight stoichiometric excess of $LiAlH_4$ at approximately room temperature using ethyl ether as a solvent. A mixture of telomers of the formula $$C_2F_5CF(CF_3)(CH_2CF_2)_nH$$

are obtained in which the average value of $n$ is about 5.

*Example 16.—Reaction of $CH_2=CF_2$ with 2-iodoperfluorohexane*

A 300 ml. Monel metal autoclave is charged with 170 g. (0.38 mole) of 2-iodoperfluorohexane and 139 g. (2.17 moles) of 1,1-difluoroethylene and heated at 188° to 191° C. with agitation for 64 hours. During the heating period, the pressure drops from 3600 lbs./in.$^2$ gage to 1000 lbs./in.$^2$ gage.

35 g. of olefin are recovered; none of the reactant iodide is isolated. The remaining product is an oil at room temperature consisting of telomer iodides of the formula $$C_4F_9CF(CF_3)[CH_2CF_2]_nI$$

is fractionally distilled under reduced pressure and the following fractions obtained:

(a) 25 g. boiling up to 97° C. at 10 mm. Hg, containing mostly telomers of the above formula where the value $n$ is 1 and 2.

(b) 45 g. consisting essentially of telomers of the above formula in which the value of $n$ is 3, the middle cut of which has a boiling point of 116.5 to 117.5° C. at 10 mm. Hg, a refractive index $n_D^{19}$ 1.358 a molecular weight of 638, an ultraviolet spectrum maximum in isooctane of 269 m$\mu$ and a molar extinction coefficient in isooctane of 259. *Analysis.*—Calculated: C, 22.6; H, 0.95. Found: C, 22.5; H, 0.63.

(c) 65 g. of telomers of the above formula in which the value of $n$ ranges from 4 to 5, having a boiling range of 131 to 145° C. mm. Hg.

(d) 82 g. of telomers of the above formula in which the average value of $n$ is 5.5, having a boiling range of 160° C. at 9 mm. Hg, to 200° C. at 8 mm. Hg.

(e) 35 g. of telomers of the above formula in which the average value of $n$ is about 8 and containing mostly telomers in which the value of $n$ ranges from 7 to 9, having a boiling range of 156° C. to greater than 225° C. at 0.1 mm. Hg.

Fractions (a) to (d) are liquids at room temperature ranging from light to heavy oils while fraction (e) consists mostly of distillable solids.

*Example 17.—Coupling $C_4F_9CF(CF_3)[CH_2CF_2]_nI$*

12.5 grams (0.19 mole) of telomer iodides of the above formula prepared in accordance with Example 16 in which the average value of $n$ is 3.5 are placed in a Vycor tube together with 8 milliliters of mercury and 10 milliliters of 1,1,2-trichlorotrifluoroethane as solvent. The tube and contents is shaken while exposed to ultraviolet irradiation for five days.

The coupled product is an oil having a boiling range of 170° to 230° C. at about 0.1 mm. Hg having the formula $$C_4F_9CF(CF_3)[CH_2CF_2]_n[CF_2CH_2]_n(CF_3)CFC_4F_9$$

where the average value of $n$ is 3.5. This oil has the following viscosities: 318 cs. at 78.4° F., 58.7 cs. at 123.8° F., 10 cs. at 197.8° F. The ASTM slope of this oil (from 78° to 198° F.) is 0.87. The conversion and yield are 83%.

*Example 18.—Coupling $C_4F_9CF(CF_3)[CH_2CF_2]_nI$*

14 g. (0.018 mole) of telomer iodides of the above formula prepared in accordance with Example 16 in which the average value of $n$ is 5.5 is placed in a Vycor tube together with 8 milliliters of mercury and 10 milliliters of 1,1,2-trichlorotrifluoroethane and the tubes and contents shaken while exposed to ultraviolet light for 5 days. A conversion and yield of 85% of a coupled product is obtained consisting of an oil, partially solid at 25° C., having a boiling range of from 180° C. to 260° C. at about 0.1 mm. Hg, and having the formula $$C_4F_9CF(CF_3)[CH_2CF_2]_n[CF_2CH_2]_n(CF_3)CFC_4F_9$$

where the average value of $n$ is 5.5. This oil has the following viscosities: 520 cs. at 100° F. (extrapolated); 204 cs. at 123.8° F.; 26.5 cs. at 197.8° F.; 21.8 cs. at 210° F. (extrapolated). The ASTM slope of this oil (from 124° F. to 198° F.) is 0.77.

Example 19.—Reaction of $CH_2=CF_2$ with 1-chloro-2-iodohexafluoropropane 1,1-difluoroethylene and 1-chloro-2-iodohexafluoropropane in the molar ratio olefin : iodide of 4:1 is heated at 185° to 188° C. for 23 hours in an autoclave. The pressure decreases from 3500 lbs./in.² gage to 700 lbs./in.² gage during this period.

A 96% conversion of the iodide to telomers of the formula $CF_3CF(CF_2Cl)[CH_2CF_2]_nI$ is obtained. The product iodides are distilled and separated into the following fractions:

(a) An 18% yield of telomers of the above formula consisting essentially of those in which the value of $n$ is 1, the middle cut of which boils from 68–69° C. at 72 mm. Hg, has a refractive index $n_D^{26}$ 1.387, a molecular weight of 377. Analysis.—Calculated: C, 16.0; H, 0.54. Found: C, 16.9; H, 1.1.

(b) A 29% yield of telomers of the above formula where the value of $n$ is essentially 2, the middle cut of which has a boiling point of 112° C. at 72 mm. Hg, a refractive index of $n_D^{26}$ 1.3880, and a molecular weight of 441. Analysis.—Calculated: C, 19.1; H, 0.92. Found: C, 19.1, H, 1.2.

(c) A 26% yield of telomers of the above formula where the value of $n$ is essentially 3, the middle cut of which has a boiling point of 114–115° C. at 9 mm. Hg, a refractive index $n_D^{31}$ 1.387 and a molecular weight of 505. Analysis.—Calculated: C, 21.4; H, 1.2. Found: C, 21.9; H, 1.4.

(d) A 16% yield of telomers of the above formula where the value of $n$ is essentially 4, the middle cut of which has a boiling point of 145° C. at 6 mm. Hg, a refractive index $n_D^{29}$ 1.3892 and a molecular weight of 569. Analysis.—Calculated: C, 23.2; H, 1.4. Found: C, 23.4; H, 1.4.

(e) A 7% yield of telomers of the above formula in which the value of $n$ is essentially 5, the middle cut of which has a boiling point of 112° C. at about 0.1 mm. Hg, a refractive index $n_D^{30}$ of 1.389 and a molecular weight of 633. Analysis.—Calculated: C, 24.7; H, 1.6. Found: C, 25.2; H, 1.8.

(f) A 4% yield of telomers of the above formula in which the average value of $n$ is 6, the middle cut of which ($n=6$) has a boiling point of 131° C. at about 0.1 mm. Hg, a refractive index $n_D^{30}$ 1.390, and a molecular weight of 697. Analysis.—Calculated: C, 25.9; H, 1.7. Found C, 26.4; H, 1.8.

Fractions (a) to (f) inclusive have molar extinction coefficients in isooctane of 331, 323, 335, 336, 318 and 317 respectively. The ultraviolet spectrum maxima in isooctane of these fractions are respectively 272, 270, 270, 270, 270, and 270 mμ, thus indicating that the telomers have a terminal —$CF_2I$ end group.

Example 20.—Reaction of $CF_2=CH_2$ with 1-chloro-2-iodohexafluoropropane

The reaction of Example 19 is repeated using a temperature of 180° C. and a reaction time of 65.5 hours. Initial pressure is 4350 lbs./in.² gage decreasing to 400 lbs./in.² gage at the end of the run. A 96% conversion of iodide to telomers of the formula $$CF_3CF(CF_2Cl)[CH_2CF_2]_nI$$

is obtained which is separated into the following fractions:

(a) A 6% yield of telomers where $n$ equals 1.
(b) A 20% yield of telomers where $n$ equals 2.
(c) A 25% yield of telomers where $n$ equals 3.
(d) A 21% yield of telomers where $n$ equals 4.
(e) A 17% yield of telomers where $n$ equals 5.
(f) An 8% yield of a mixture of telomers in which the average value of $n$ is 6.
(g) A 3% of a mixture of telomers in which the average value of $n$ is equal to 8, including telomers where the value of $n$ ranges from about 7 to 10 inclusive.

Example 21.—Coupling of $CF_3CF(CF_2Cl)[CH_2CF_2]_nI$ 20 g. (0.036 mole) of telomers of the above formula prepared in accordance with Example 19 in which the average value of $n$ is 3.9, together with 8 milliliters of mercury and 10 milliliters of 1,1,2-trichlorotrifluoroethane are placed in a Vycor tube which is then shaken under ultraviolet light at room temperature for 4 days. A heavy oil product is obtained in 83% yield having a boiling range of 153° C. to 240° C. at about 0.1 mm. Hg, and having the formula $$CF_3CF(CF_2Cl)[CH_2CF_2]_n[CF_2CH_2]_n(CF_2Cl)CFCF_3$$

where the average value of $n$ is 3.9. This oil has the following viscosities: 455 cs. at 78.4° F., 181 cs. at 100° F. (extrapolated), 86.4 cs. at 123.8° F., 14.6 cs. at 197.8° F., 11.95 cs. at 210° F., (extrapolated). The ASTM slope of this oil (from 78° to 198° F.) is 0.79.

Example 22.—Coupling of $CF_3CF(CF_2Cl)[CH_2CF_2]_nI$ 22 g. (0.035 mole) of telomers of the above formula prepared in accordance with Example 19 in which the average value of $n$ is 4.9, together with 8 milliliters of mercury and 10 milliliters of 1,1,2-trichlorotrifluoroethane are placed in a Vycor tube which is shaken while exposed to ultraviolet irradiation for 6 days. A yield and conversion of 70% of coupled product of the formula $$CF_3CF(CF_2Cl)[CH_2CF_2]_n[CF_2CH_2]_n(CF_2Cl)CFCF_3$$

a heavy oil (partially solid) at 25° C. is obtained having a boiling range of 153° C. to 210° C. at less than 0.1 mm. Hg. This oil has the following viscosities: 610 cs. at 100° F. (extrapolated), 249 cs. at 123° F., 34.6 cs. at 197.8° F., 28 cs. at 210° F. (extrapolated). The ASTM slope of this oil (from 124° F. to 198° F.) is 0.71.

Example 23.—Chlorination of $CF_2ClCF(CF_3)[CH_2CF_2]_nI$

A fraction of telomer iodides of the above formula prepared in accordance with Example 19 in which the average of $n$ is about 7 is chlorinated at a temperature of 160–180° C. in the same manner as described in Example 12. A telomer chloride product is obtained consisting of telomers of the formula $$CF_2ClCF(CF_3)[CH_2CF_2]_nCl$$

in which the average value of $n$ is about 7, a very viscous oil having an ASTM viscosity-temperature slope of the order of 0.7.

Example 24.—Fluorination of $CF_2ClCF(CF_3)[CH_2CF_2]_nI$

A fraction of telomer iodides prepared in accordance with Example 19 of the above formula in which the average value of $n$ is about 6 is fluorinated by treatment with a slight molar excess of $SbF_3Cl_2$ at a temperature of 100° C. for 4 hours following the procedures of Example 6. The fluorinated product consists of telomer fluorides of the formula $CF_2ClCF(CF_3)[CH_2CF_2]_nF$ where the average value of $n$ is about 6, a viscous oil having an ASTM viscosity-temperature slope of the order of 0.75.

Example 25.—Reaction of $CH_2=CF_2$ with 1,2-dibromoperfluoropropane

A 300 milliliter Monel autoclave is charged with 201.5 g. (0.65 mole) of 1,2-dibromoperfluoropropane and cooled with liquid nitrogen. By gaseous transfer in vacuo, 131 g. (2.05 moles) of 1,1-difluoroethylene is introduced into the autoclave which is then heated at 220° C. for 119 hours while shaking. The pressure drops from 6200 to 1900 lbs./in.² gage during this time. 70 g. of olefin and 95 g. of the reactant dibromide are recovered.

The remaining product (116 g.) consists of a mixture of telomer bromides of the formula $$CF_2BrCF(CF_3)[CH_2CF_2]_nBr$$

which is distilled into the following fractions:
(a) 10 g. boiling up to 63° C. at 10 mm. Hg, consisting of clear, colorless liquid.
(b) 4 g. having a boiling range of 54° to 82° C. at about 0.1 mm. Hg, consisting of a clear, colorless oil.
(c) 4 g. having a boiling range of 82° to 127° C. at 0.1 mm. Hg, consisting of a colorless oil.
(d) 12 g. of a solid having a melting point of 25° to greater than 35° C. and a boiling range of 127° to 195° C. at about 0.1 mm. Hg.
(e) 13 g. of a solid having a melting point of 50° to 55° C. and a boiling range of 180 to 310° C. at less than 0.1 mm. Hg.
(f) A residue of 10 g. remains undistilled at temperatures higher than 310° C. at less than 0.1 mm. Hg.

This application is a continuation-in-part of copending application Serial No. 663,005, now abandoned, filed June 3, 1957, of Murray Hauptschein and Milton Braid for Fluorinated Organic Compounds.

We claim:
1. Compounds of the general formula $R(CH_2CF_2)_nQ$ where Q is selected from the class consisting of halogen and hydrogen; where $n$ is an integer, and where R is a halogenated radical having from 3 to 12 carbon atoms selected from the class consisting of $ACX_2$—,

$$A-\underset{X}{\overset{B}{\underset{|}{C}}}-$$

and $ACX_2CHX$— radicals, where X is selected from the class consisting of fluorine and chlorine, and A and B are alkyl radicals containing only elements selected from the class consisting of carbon, halogen and hydrogen.

2. Compounds in accordance with claim 1 wherein A and B are selected from the class consisting of perfluoroalkyl, perfluorochloroalkyl, perfluorohydroalkyl, and perfluorochlorohydroalkyl radicals.

3. Compounds in accordance with claim 2 wherein said alkyl radicals are branched chain radicals.

4. Compounds in accordance with claim 1 in which R is selected from the class consisting of branched chain perfluoroalkyl and branched chain perfluorochloroalkyl radicals having from 3 to 9 carbon atoms.

5. A fluorinated oil comprising compounds of the formula $R(CH_2CR_2)_nX$ where $n$ is an integer having a value in the range of from 3 to 16 inclusive and where R is an halogenated radical having from 3 to 12 carbon atoms selected from the class consisting of $ACX_2$—

$$A-\underset{X}{\overset{B}{\underset{|}{C}}}-$$

and $ACX_2CHX$— radicals where X is selected from the class consisting of fluorine and chlorine, and where A and B are alkyl radicals containing only elements selected from the class consisting of carbon, halogen and hydrogen.

6. A fluorinated oil consisting predominantly of compounds as defined in claim 5 wherein the value of $n$ is in the range of from 4 to 10 inclusive.

7. A fluorinated oil comprising compounds of the formula $R(CH_2CF_2)_nX$ where X is selected from the class consisting of fluorine and chlorine, where $n$ is an integer having a value in the range of from 4 to 10 and where R is a halogenated radical having from 3 to 12 carbon atoms selected from the class consisting of perfluoroalkyl, perfluorochloroalkyl, perfluorohydroalkyl and perfluorochlorohydroalkyl radicals.

8. A fluorinated oil comprising compounds of the formula $CF_3CF(CF_2Cl)[CH_2CF_2]_nX$ where $n$ is an integer in the range of from 4 to 10 inclusive and where X is selected from the class consisting of chlorine and fluorine.

9. A fluorinated oil comprising compounds of the formula $C_2F_5CF(CF_3)[CH_2CF_2]_nX$ where $n$ is an integer in the range of from 4 to 10 inclusive, and where X is selected from the class consisting of chlorine and fluorine.

10. A fluorinated oil comprising compounds of the formula $C_4F_9CF(CF_3)[CH_2CF_2]_nX$ where $n$ is an integer in the range of from 4 to 10 inclusive and where X is selected from the class consisting of chlorine and fluorine.

11. A fluorinated oil comprising compounds of the general formula $R(CH_2CF_2)_n(CF_2CH_2)_mR$ were $n$ and $m$ are integers and the value of $n+m$ is in the range of from 6 to 20 inclusive, and where R is a halogenated radical having from 3 to 12 carbon atoms selected from the class consisting of $ACX_2$—, $$A-\underset{X}{\overset{B}{\underset{|}{C}}}-$$

and $ACX_2CHX$— radicals, where X is selected from the class consisting of fluorine and chlorine, and where A and B are alkyl radicals containing only elements selected from the class consisting of carbon, halogen and hydrogen.

12. A fluorinated oil consisting predominantly of compounds as defined in claim 11 wherein the value of $n+m$ falls in the range of from 6 to 15.

13. Fluorinated oil in accordance with claim 12 wherein R is selected from the class consisting of perfluoroalkyl, perfluorochloroalkyl, perfluorohydroalkyl and perfluorochlorohydroalkyl radicals.

14. Fluorinated oil comprising compounds of the formula $$CF_3CF(CF_2Cl)[CH_2CF_2]_n[CF_2CH_2]_m(CF_2Cl)CFCF_3$$

where $n$ and $m$ are integers, the sum of $n+m$ being in the range of from 6 to 15 inclusive.

15. Fluorinated oil comprising compounds of the formula $$C_4F_9CF(CF_3)[CH_2CF_2]_n[CF_2CH_2]_m(CF_3)CFC_4F_9$$

where $n$ and $m$ are integers, the sum of $n+m$ being in the range of from 6 to 15 inclusive.

16. Compounds in accordance with claim 1 in which Q is iodine.

References Cited in the file of this patent
UNITED STATES PATENTS

| | | |
|---|---|---|
| 2,594,560 | Howard | Apr. 29, 1952 |
| 2,700,661 | Miller | Jan. 25, 1955 |
| 2,705,706 | Dittman et al. | Apr. 5, 1955 |
| 2,770,659 | Barnhart | Nov. 13, 1956 |

OTHER REFERENCES

Miller et al.: Industrial and Engineering Chemistry, volume 39, March 1947, pages 333–337, page 334 needed only.

UNITED STATES PATENT OFFICE
CERTIFICATION OF CORRECTION

March 14, 1961

Patent No. 2,975,220 Murray Hauptschein et al.

It is hereby certified that error appears in the above numbered patent requiring correction and that the said Letters Patent should read as corrected below.

Column 17, line 49, for "$R(CH_2CR_2)_nX$" read -- $R(CH_2CF_2)_nX$ --.

Signed and sealed this 8th day of August 1961.

(SEAL)
Attest:

ERNEST W. SWIDER
Attesting Officer

DAVID L. LADD
Commissioner of Patents